(12) United States Patent
Shimooka

(10) Patent No.: US 7,665,200 B1
(45) Date of Patent: Feb. 23, 2010

(54) MULTIPLE PURPOSE CNC MACHINE

(76) Inventor: Mike Seiji Shimooka, 700 E. Vista Way, Vista, CA (US) 92084

( * ) Notice: Subject to any disclaimer, the term of this patent is extended or adjusted under 35 U.S.C. 154(b) by 0 days.

(21) Appl. No.: 12/380,629

(22) Filed: Feb. 27, 2009

(51) Int. Cl.
*B23P 23/00* (2006.01)
*B23C 1/06* (2006.01)

(52) U.S. Cl. .................. 29/560; 409/212; 409/237; 409/235; 408/235

(58) Field of Classification Search ............ 409/202, 409/212, 235, 237–239, 236; 29/560; 408/234–235
See application file for complete search history.

(56) References Cited

U.S. PATENT DOCUMENTS

| | | | |
|---|---|---|---|
| 2,983,199 A | 5/1961 | Daugherty | |
| 3,168,000 A | 2/1965 | Deflandre | |
| 3,580,133 A | 5/1971 | Berthiez | |
| 3,680,438 A * | 8/1972 | Good et al. ............ | 409/235 |
| 3,683,744 A | 8/1972 | Briesofsky | |
| 3,707,333 A | 12/1972 | Kitamura | |
| 3,853,423 A | 12/1974 | Quack | |
| 4,048,902 A | 9/1977 | Deflandre | |
| 4,102,245 A | 7/1978 | Cousins | |
| 4,447,178 A | 5/1984 | Esser | |
| 4,466,770 A | 8/1984 | Peroutky | |
| 4,787,786 A | 11/1988 | Freud | |
| 4,973,819 A | 11/1990 | Thatcher | |
| 5,340,247 A | 8/1994 | Cuneo et al. | |
| 5,697,413 A | 12/1997 | Fuller | |
| 5,848,458 A | 12/1998 | Bullen | |
| 6,068,431 A | 5/2000 | Line | |
| 6,674,040 B2 * | 1/2004 | Wehrli ............ | 219/69.11 |
| 6,719,506 B2 | 4/2004 | Chang | |
| 6,798,088 B2 | 9/2004 | Hsu | |
| 7,441,994 B2 * | 10/2008 | Hsieh ............ | 409/237 |

FOREIGN PATENT DOCUMENTS

| | | | |
|---|---|---|---|
| JP | 57-194810 A | * | 11/1982 |
| JP | 61-086109 A | * | 5/1986 |

* cited by examiner

*Primary Examiner*—Erica E Cadugan

(57) ABSTRACT

A multiple purpose CNC machine that is mountable on a framed, mobile dolly. The machine includes: an open frame base Y-axis (200), a gantry X-axis (300), and a double angle plate (400) that provides mounting surfaces for tooling/instruments such as a Z axis module (500). The double angle plate also allows for mounting of a second Z axis module on the opposite face. The modular Z axis module includes a horizontally rigid counterweight assembly. The counterweight assembly facilitates the adding/subtracting of counterbalancing weights. The Y axis base includes provisions for placement of a tooling plate that is secured on precision machined pads of the Y axis base. The pads also include reference dowel pins. The CNC machine is multiple purpose and can be configured with a high-speed spindle or other material-removing tools, can be used with tooling such as in robotic applications, or can be used with a camera system such as for inspection tasks. The CNC machine can be configured with positioning control motors of either a closed loop servo system or an open loop stepper/linear motor system.

3 Claims, 8 Drawing Sheets

MULTIPLE PURPOSE CNC MACHINE

CROSS REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

This invention relates to computer numerical control milling machines and industrial robotic machines.

BACKGROUND OF THE INVENTION

Many jobs and tasks in industry and laboratories require precision motion control. The degree of rigidity and the amount of table travel in the X, Y, and Z planes are important considerations in most applications. Standard Computer Numerical Control (CNC) machines are commonly used in order to fulfill these needs. These CNC machines are necessarily complex and relatively expensive. CNC machines can be miniaturized but rigidity is compromised mainly because a smaller ball screw has to be used. An alternate solution is to custom build a special machine or to retrofit an existing machine. However, people not skilled in these areas cannot easily perform these tasks and the custom build or retrofit can end up costing more than the purchase of a standard CNC machine.

Applications such as composite/fiberglass machining are usually performed on standard CNC milling machines that are primarily made for machining metals and are relatively expensive. CNC machines have relatively large built-in spindles that cannot achieve sufficiently high rotations per minute (RPM) for efficient machining of composite type materials. In addition, because these types of materials are non-conductive to heat, the cutting tool gets very hot, leaves burn marks, and shortens the life of the cutting tool. In many applications coolants cannot be used because the material absorbs the contamination in the liquid coolant. In order to solve this problem, a high-speed spindle is sometimes custom installed. High-speed spindles are smaller than the standard spindles on milling machines and have much less horsepower. Therefore, much of the heavy weight and sturdiness of the machine is not utilized as the smaller horsepower spindle becomes the limiting factor. Therein is a need for a machine that can easily adapt a high-speed spindle and is rigid enough to machine composite type materials, flat stock type metals, such as aluminum sheets, and small precision metal parts.

Precision motion control is a necessary requirement in the robotics field, which uses the same or similar CNC capabilities and functions as applied to CNC machine tools. Robotics are often viewed as an articulating arm with a hand-like device that performs a task. In some industrial sectors robotics can also mean a machine that can move a functional tool or instrument in a multi-dimensional plane with a certain degree of precision in order to perform a task.

The machine of this invention is made to be capable of use in both machining and robotics areas. The invention is relatively light but relatively rigid. The invention fulfills most travel requirements, is mobile and portable, and is easily serviceable by the end user. Finally, the invention is suitable for a wide range of CNC and other robotic applications which are presently done on more expensive and necessarily complex CNC machines or custom-built machines.

PRIOR ART

A prior art search was completed and the following patents were noted:

U.S. Pat. No. 5,340,247 and U.S. Pat. No. 5,697,413 show gantry type configurations, but neither machine has the rigidity to machine hard materials, nor do they indicate the use of ball screws for the efficient conversion of rotary motion into linear motion to maximize thrust for a given size motor. The inclination of the vertical load to back drive and crash down is present in both patents. However, even though an acme screw is not as efficient as a ball screw, an acme screw has about twice the friction of a ball screw and might hold the vertical load (vertical carriage and cutting tool, such as a router), but not reliably. However, an acme screw might not be of prime importance in these applications. (Not considering the vertical load factor is a common mistake. As the screw wears in or if the coupling or belt from the screw to the drive motor breaks or slips, the resulting back drive force can cause an uncontrollable fall of the vertical elements.)

U.S. Pat. No. 4,102,245 is a fabricated open frame machine with a constant feed motor driving the X and Y axis, and an adjustable vertical depth spindle assembly. This machine is portable but is made for special applications and is not a CNC or robotic device. This machine also does not have a motion-controlled Z-axis. Note that in drawing sheet 4 of this patent, FIG. 16 and FIG. 17, item number 13 and 13' are off-the-shelf-rails that serve as a motion-controlled Z-axis. There are gaps between the rails and pillow blocks as shown in FIG. 16 item 23, and FIG. 17 item 33 that could be made wider, thereby increasing the rigidity of the supporting elements of the shafts or linear ways. (The Rails are Widened in this Invention.)

U.S. Pat. No. 4,466,770 shows a fabricated open frame machine with a Z-axis that can have optional embodiments. This machine is made for robotic applications and does not have the rigidity for CNC machining applications even if fitted with cutting tools. (Castings are almost always used in the basic framework of CNC machines to maximize rigidity. Note that this machine uses a brake on the vertical axis to keep the carriage from falling in event of a power failure.)

U.S. Pat. Nos. 4,973,819 and 5,848,458 are typical gantry type CNC machines, which are usually large and mostly specialized.

U.S. Pat. No. 6,068,431 and U.S. Pat. No. 6,719,506 B2 are fairly massive and complex gantry type machines using specialized parts, which indicates that the machines are very expensive and mostly used in special applications.

U.S. Pat. No. 6,798,088 B2 is another gantry type CNC milling machine using linear motors instead of ball screws. Note that the vertical axis in this invention requires a weight compensation device (page 5 line 20, page 6 line 15, and line 29). Like stepper motors, linear motors can mis-position if subjected to a sudden change in load, especially in a rapid up move when the vertical weight is not counteracted or counterbalanced. If the pneumatic device in this patent malfunctions, the Z axis would probably fall uncontrollably. The stator of this type of motor is also part of the linear slide, so a brake is not usable. A brake on the screw or motor in a more standard configuration still does not alter the condition of the vertical axis having a different load factor as it moves up and down. Without a counterweight, the Z axis motor usually must be oversize. U.S. Pat. Nos. 2,983,199; 3,168,000; 3,580, 133; 3,683,744; 3,707,333; 3,853,423; 4,048,902; and 4,447, 178 are inventions particularly related to problems that need more complex counterweights to support spindles or tools that move out horizontally from their supporting ways.

U.S. Pat. No. 4,787,786 is a 2 axis manually operated machine with 2 back-to-back dual shaft rail systems for the vertical moving axis. The rail systems are mounted on their ends to a base. For the counterweight, one of the dual shaft assemblies is used with its slide, and it has an added weight in order to balance out the moving tool and its supporting slide. This machine is specialized for cutting laminates using a roller bearing on the head of the cutting blade as a guide. In the drawing on sheet 2 of U.S. Pat. No. 4,787,786, the second dual shaft (FIG. 3 item 16) and its pillow block mounted slide (FIG. 3 item 20) are part of a vertical tool holding fixture and the dual shaft base is fixed stationary with the base. The weight of the dual shaft rail with its additional size is not a detrimental factor in the design of this patent. The mounting of a vertical axis on a moving gantry necessitates minimizing weight and size. (The machine of this invention eliminates the extra weight and space of the second dual shaft rail and slide used in the above patent, and allows for a narrow rear profile, while including a horizontally rigid vertically moving counterweight. The machine of this invention also allows for easily adding/subtracting of counterweights.)

SUMMARY OF THE INVENTION

This invention provides a multi-purpose computer controlled machine that can more economically perform tasks in many CNC applications as well as perform tasks in the industrial robotic field.

In addition to the advantages of an open-frame gantry type computer numerical controlled machine, this invention provides the following advantages:

a) A rigid but relatively light machine which the user can install on a framed dolly. The whole machine is easily transportable without heavy-duty moving equipment and can be transported on a compact-size pickup truck.

b) Base castings can be machined for use with different types of linear bearing ways.

c) The machine adapts a common and readily available machine tool precision ball screw in two different standard lengths, with its standardized pre-machined journals (including their matched pair thrust bearings, and dial assembly). The machine also adds support and motor mount assemblies that enable a ball screw assemblies to be configured on top of a machine tool table instead of being buried inside and underneath the table.

d) The machine includes a double angle plate that allows for multi-purpose use by allowing easily mountable tooling or instruments on one or two vertical surfaces, for use in CNC material working or industrial robotic uses. The machine also allows multiple mounting of Z-axis assembly modules.

e) The machine includes a horizontally rigid counterweight system for the Z-axis assembly module.

f) The machine includes an easy method of adding or subtracting counterweights.

Additional advantages of the invention will become apparent from a consideration of the following detailed description and accompanying drawings.

DETAILED DESCRIPTION OF PREFERRED EMBODIMENT

Figures 1, 2, 3:
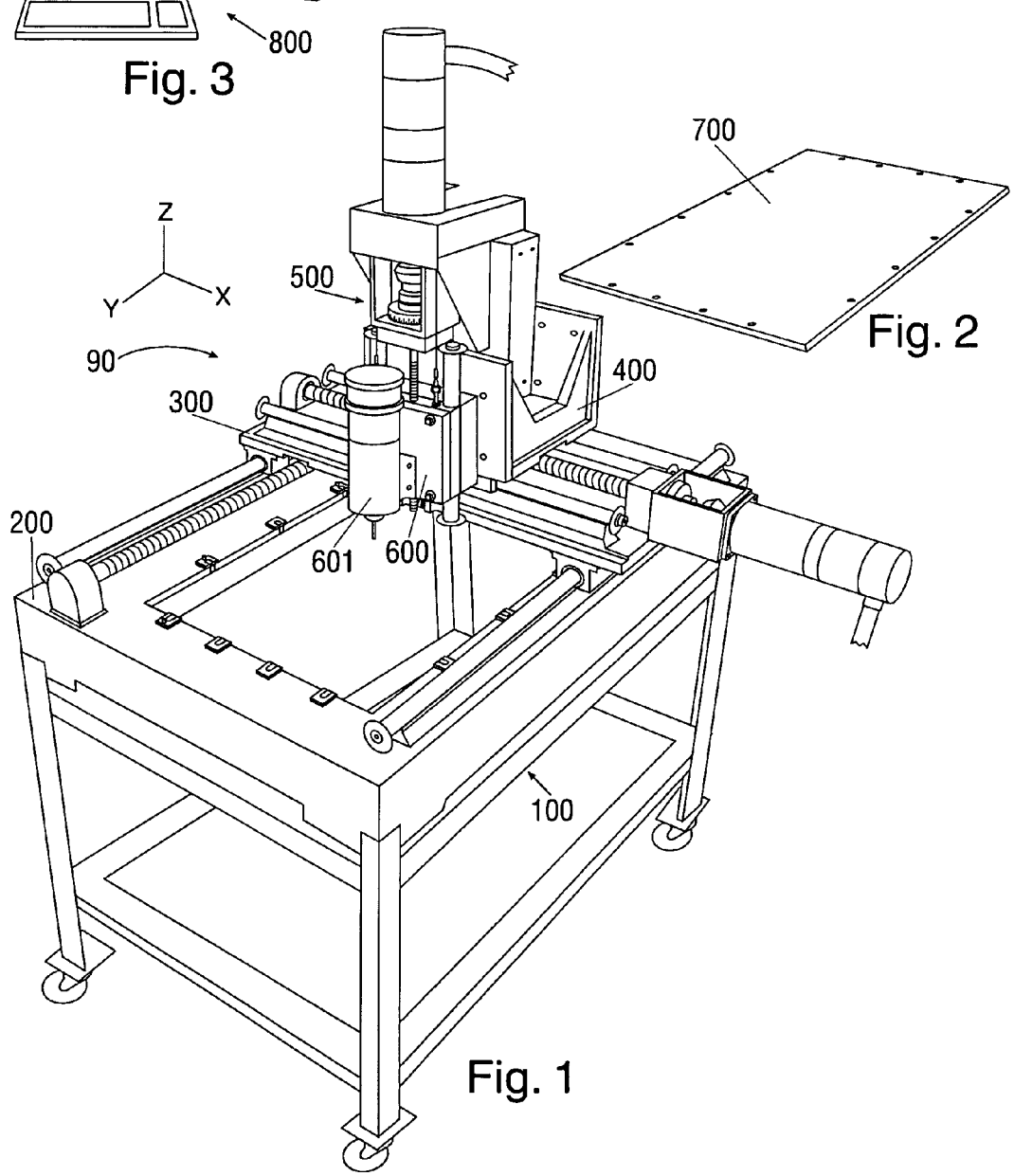
FIG. 1 is a perspective view of a preferred embodiment according to this invention, without the ball screw covers and with reference to a standard Cartesian coordinate system as indicated in the drawing referencing the X, Y, and Z planes.
FIG. 2 is a perspective view of an add-on tooling plate 700.
FIG. 3 is an illustration of a compute system 800 that includes motion control and miscellaneous function circuit boards, and a connecting cabinet that includes subassemblies and drives for computer numerical control (CNC) applications and/or robotic applications.

FIG. 1 is a perspective view of a machine 90 in accordance with a preferred embodiment of the invention. The machine is mounted upon a framed dolly assembly 100. The four corners of the dolly frame that support the machine 90 have adjustable mounting hardware (not shown) for leveling the machine. The movement of the machine axis is based on the standard designation of a Cartesian coordinate system, as shown for the X, Y, and Z axes. A Y-axis frame 200 is the base that enables precision motion control in the Y-axis. An X-axis frame 300 is the sliding carriage orthogonally mounted on the Y-axis and is the supporting gantry for a dual angle plate 400. A dual angle plate 400 is the sliding carriage orthogonally mounted on the X-axis, and includes two vertical, opposite-facing machined surface plates that are perpendicular to both the X and Y axes. A Z-axis assembly module 500 is mounted on one of the vertical surface plates of the dual angle plate 400. The Z-axis assembly module 500 is modular with supporting framework integrating a horizontally rigid counterweight system that also includes and facilitates easy adding or subtracting of weights in order to counterbalance a vertical load. The Z axis assembly module includes an off-the-shelf dual rail slide that is retrofitted with a ball screw assembly for precision motion control. The Z-axis assembly module 500, including the ball screw assembly can also be retrofitted on other off-the-shelf slides including ones with square shafts and linear bearing ways. A Z-axis tooling plate 600 on a linear sliding carriage allows fastening a tool/instrument of choice on the carriage, such as a high-speed spindle 601.

FIG. 2 illustrates a rectangular tooling plate 700 that is machined or ground flat and can be used to mount fastening fixtures. The tooling plate 700 is fastened to the Y-axis frame 200. Drilled and tapped screw holes are located along the periphery of the tooling plate.

In the processing and machining of sheet or wafer materials such as composites, fiberglass, and semi-conductors, submersing the part under a sheet of liquid is sometimes advantageous. In these types of processes, the tooling plate 700 can have bordering fixtures with a vertical frame and gasket. Since the part is stationary and the tooling is made to move on this machine, the liquid surface is minimally disturbed. (On standard milling-type machines, one or more table(s) is/are made to move for positioning. On this machine, the table is stationary and only the tool moves in the X, Y, and Z, planes.) This machine can make fairly large flat items like composite or fiberglass pallets used for holding printed circuit boards during conveyance through wave soldering machines. The machine has the necessary travel on both the X and Y axes and can easily adapt the use of a high-speed spindle used for machining composite materials. The tooling plate can also be of clear acrylic plastic, for applications such as precision location on photo negatives, with a camera mounted on the vertical axis.

FIG. 3 shows a computer numerical control (CNC) system 800 that includes a personal computer (PC) 802 or other suitable programmable computer, connected to a cabinet 804 containing the electrical and electronic systems that operate the motors and miscellaneous control functions of a CNC machine 90. The PC 802 is modified with added circuit boards and custom software that enables it to be part of a CNC system. In this embodiment, a standard rolling cart (not shown) supports the CNC system 800 but other support structures can be used. The cabinet 804 can be mounted with the computer system 800 or with the framed dolly 100 (FIG. 1). The CNC system is easily separated from the machine 90 through cable connectors, which can be separated on either end. The CNC system can be configured using servo, stepper or linear motors, with their associated drive electronics.

Figure 4B:
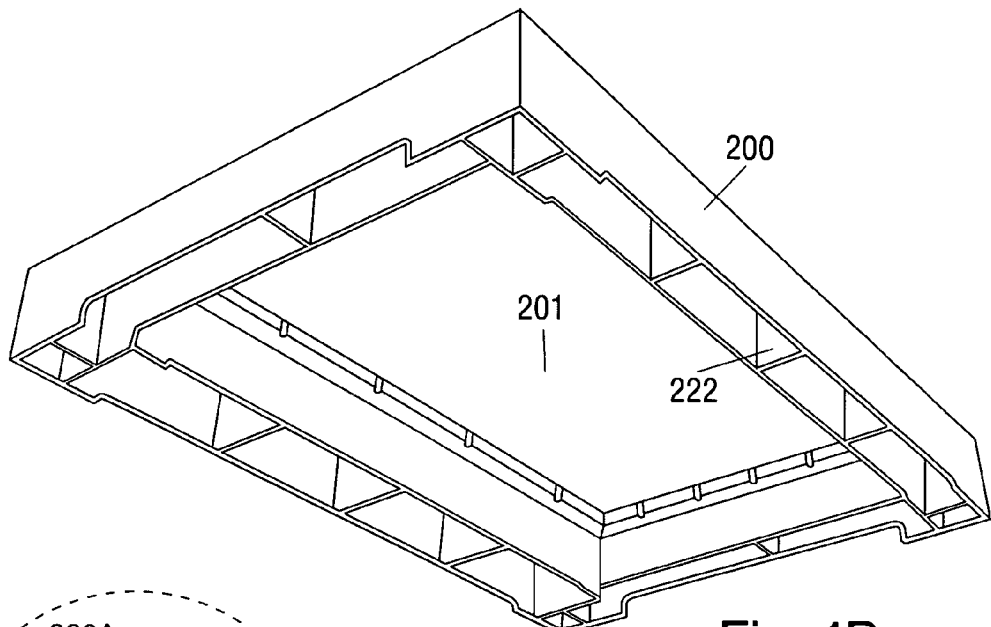
FIG. 4B is a perspective view of the underside of the Y-axis base.
Figure 4A:
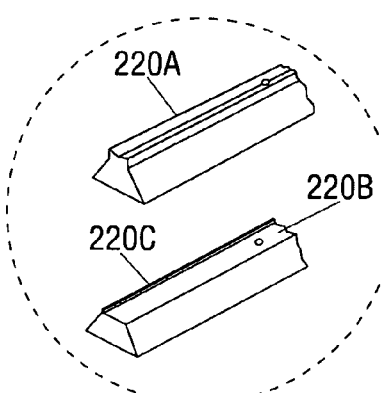
FIG. 4A is an enlarged view of a portion of support rails on the X and Y axis castings that show two different rail embodiments.
Figure 4:
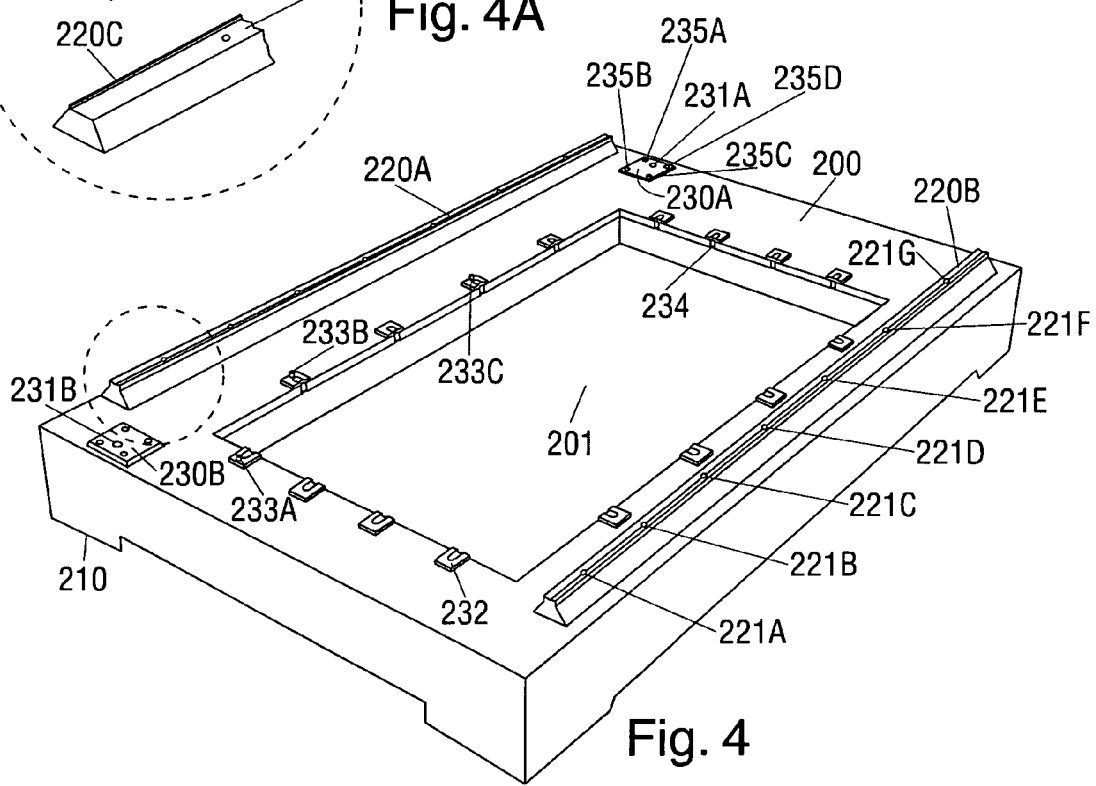
FIG. 4 is a perspective view of an open-frame casting, designated as a Y-axis base.

FIG. 4 shows the open frame Y-axis base 200 and shows placement of key precision-machined elements that are cast into the base. The open part of the frame is indicated by a rectangular hole 201. Initially, the base 200 is turned upside down and bottom corner 210, typically one of four, of the casting 200 is machined flat and parallel with reference to the rails 220A and 220B (which are rectangular and flat before being machined). The casting is then turned right side up. The two bearing block pads 230A and 230B, and the sixteen tooling plate pads (pad 232 is typical of 1 of 16 pads) on the top surface of the base 200 are machined flat to the same level. Precision holes 231A and 231B are drilled and reamed on the two bearing block pads 230A and 230B, and used as reference alignment and centering holes for bearing blocks (not shown) that support the Y axis ball screw. (Bearing block pads 230A, and 230B are symmetrical and allow the motor to be placed on either end of the Y base 200.) Precision holes are drilled and later fitted with dowel pins 233A, 233B, and 233C, and used as reference locators for tooling plate 700 (not shown). Slot 234 (typical of 1 of 16) is milled into each of the sixteen tooling plate pads that allow securing of tooling plate 700 (not shown). Anchoring holes 235A, 235B, 235C, and 235D are drilled into bearing block pad 230A. (Similar holes are drilled in bearing block pad 230B.) The sides of the rails 220A and 220B are machined minimally to maximize the strength of the rail, while allowing adequate clearance for mounted sliding parts. The machined V grooves 220A and 220B are both precision machined to be parallel with precision reference holes 231A and 231B on the bearing block pads 230A and 230B. Anchoring holes 221 A-G are drilled for securing a shaft (not shown) on rail 220B. Similar holes are drilled for rail 220A.

FIG. 4A (in dotted circle) is a perspective, enlarged, partial exposure of two alternate mounting bases for either round or rectangular shafts. (Both Y and X axis castings have the same rail base.) The top rail illustrates a V groove rail 220A, as in the preferred embodiment. The bottom rail 220B illustrates an alternative embodiment wherein the rails are machined flat and on at least one rail (220B is shown for example), a precise ledge 220C is machined as a reference to easily align a rectangular-shaped shaft (not shown) so that it is parallel with a ball screw.

FIG. 4B is a perspective view of the underside of the Y-axis casting base 200. Reinforcing wall 222 (a typical wall) in the casting gives rigidity to the casting, yet allows the casting to be relatively light. Rectangular hole 201 subtracts weight from the casting base 200, which allows for use in robotic or other types of applications, not requiring an attachable table.

Figure 5:
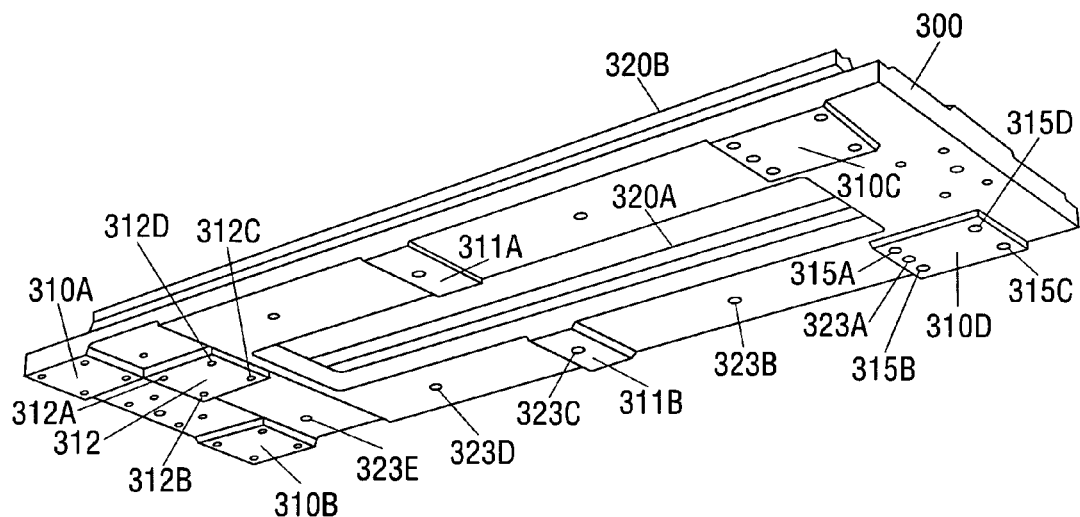
FIG. 5 is a perspective view of the underside of an X-axis casting base.

FIG. 5 is a perspective view of the under side of the X-axis base 300 showing the key elements cast into the base and precision machined. The underside of the X-casting 300 is first machined flat on pads 310 A-D, 311A, 311B, and 312. Holes 315 A-D are also drilled and tapped to secure a pillow block (not shown) on pad 310D. Similar holes are drilled and tapped for pads 310 A-C. Counter-sunk holes 323 A-E are drilled for socket head cap screws that secure a round shaft (not shown) that is placed on top of the V groove, on a top railing 320A. Similar countersunk holes are drilled for socket head cap screws that secure a round shaft on 320B. Through holes 312 A-D are drilled on the ball nut block pad 312 to secure a Y-axis ball nut block (not shown) to the X-axis base 300 which is a sliding carriage moving in the Y-axis direction. (Pads 311A, and 311B are center located and used for keeping the two railings 320A and 320B flat during the machining process.)

Figure 5A:
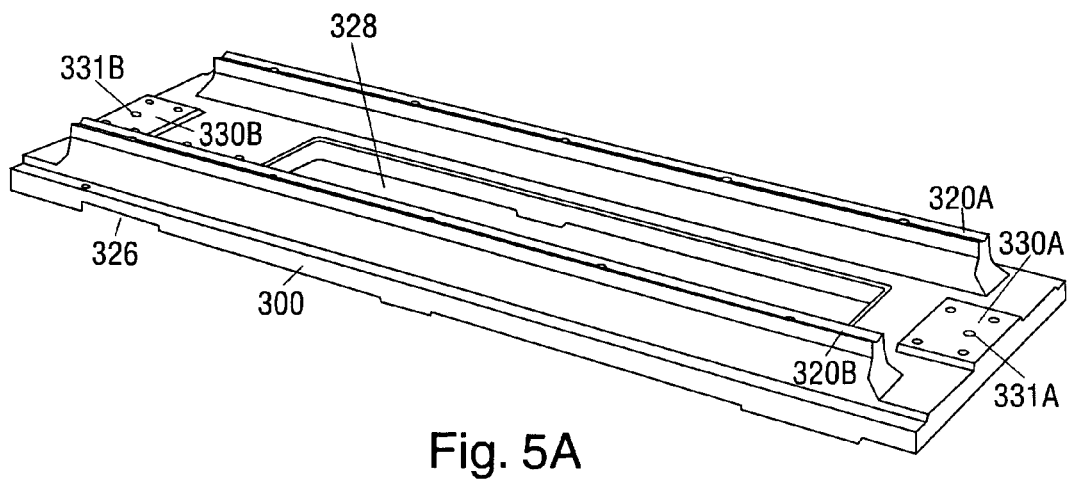
FIG. 5A is a perspective view of the top side of the X-axis base.

FIG. 5A is a perspective view of the top side of the X-axis base 300 showing the V groove embodiment of machined rails 320A and 320B (profiled the same as the Y-axis rails), and mounting holes that secure the two round shafts (not shown). Bearing block pads 330A and 330B are machined flat. Precision holes 331A and 331B are drilled and reamed to receive precision ground shoulder screws (not shown) used for reference centering of the bearing block pads (not shown) that enable precise parallel alignment with the two rails 320A and 320B. The hardware including mounting holes, pads, and bearing blocks are the same as the previously described Y casting base 200, and only the X-axis ball screw 335 is shorter, using the standard, short-table, precision-ground ball screw made for BRIDGEPORT (trademark of the Hardinge Co) manual milling machines. Rectangular hole 328 minimizes weight of the casting base 300. Channel 326 is for clearance and allows full travel along the Y-axis.

Figure 6:
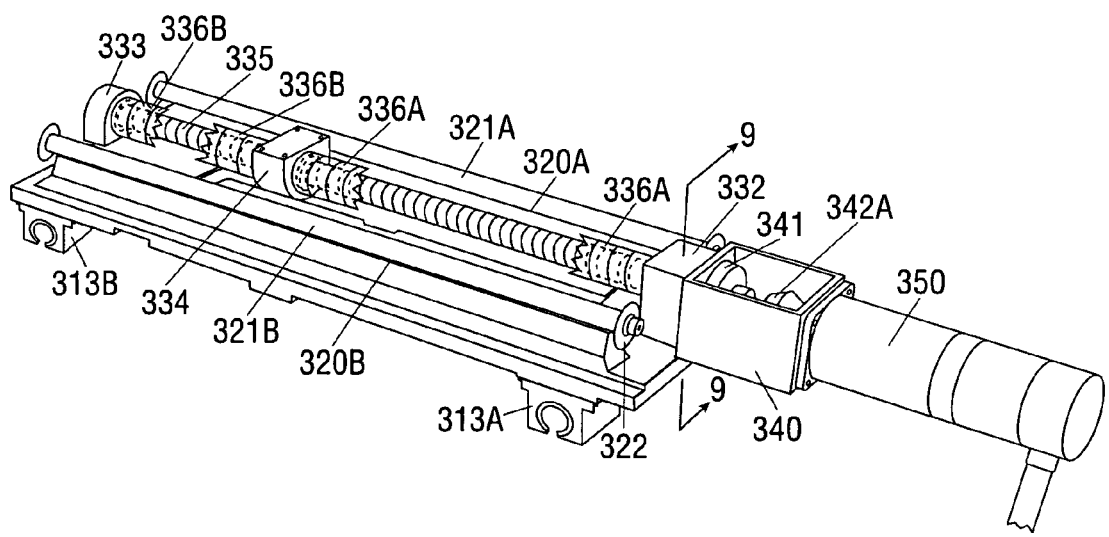
FIG. 6 is a perspective view of the X-axis base with a pair of rails, including their shafts, a complete mounted ball screw assembly including a ball nut block, two bearing blocks, dial hardware, ball screw covers, and a motor. The complete ball screw assembly is the same for the Y and X axes and only the lengths of the ball screws are different.

FIG. 6 is a perspective view of the X-axis base including a ball screw assembly and motor. The bottom of the casting also shows two pillow blocks 313A and 313B of the four that are mounted on the bottom portion of the casting. Two round shafts 321A and 321B are mounted on the rails 320A and 320B, with an end stopper 322 (typical for each shaft end) consisting of a socket head cap screw, a lock washer, and a hardened flat washer. A ball screw 335 is mounted along the centerline, supported in a thrust bearing block 332 on one end, and a radial bearing block 333 on the other end. The radial bearing block 333 supports one end of the ball screw on a radial bearing (not shown) and allows for any slight axial movement of the ball screw. The ball screw 335 is anchored on the other end in the thrust bearing block 332. (The bearing blocks 332 and 333 are fastened to holes as shown in FIG. 5A on pads 330A and 330B, along with shoulder screws in holes 331A and 331B.) The ball screw 335 is covered by telescoping spring-loaded steel covers 336A and 336B (shown with center sections removed). The thrust bearing block 332 also supports the motor mount 340 with three socket head cap screws (not shown) inside a concave inner hollow of the dial 341. One half of a coupling unit 342A is secured onto the journal of the ball screw, and the other half of the coupling unit is secured on the shaft of the motor 350. A ball nut block 334 secures the ball screw nut (not shown but captured in block 334) of lead screw 335, and attaches to the underside of the dual angle plate 400, as shown in FIG. 1.

In the preferred embodiment, the servo motor 350 (with integral tachometer and encoder) is fastened to the motor mount 340 by four screws (not shown). This machine can also be installed with linear scales for position feedback, as part of the CNC system to substitute for the rear shaft encoder, normally coupled to the rear of the motor.

Figure 7:
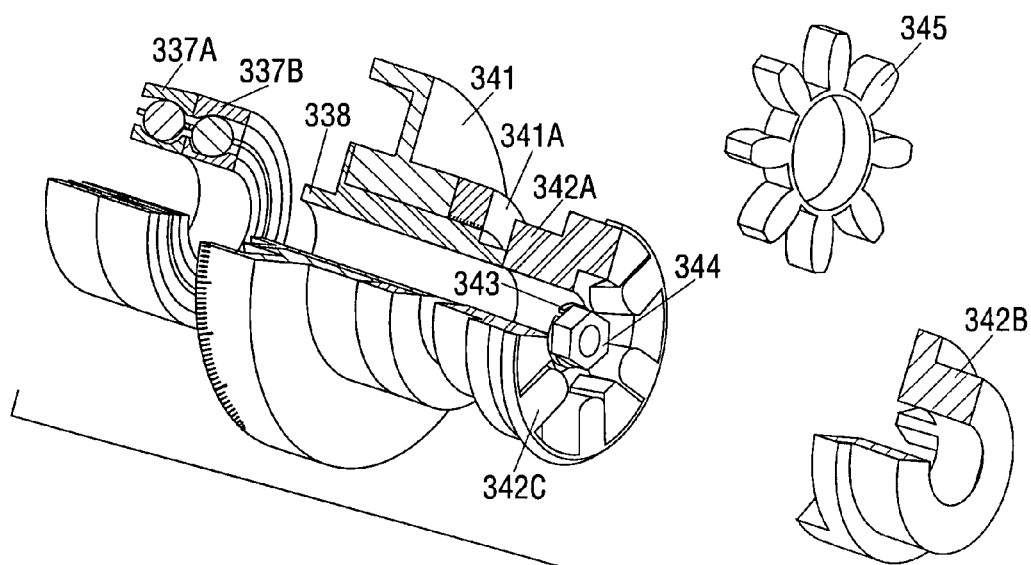
FIG. 7 is a cut-away, exploded, partial-perspective view of components that fit onto the journal of the Y/X axis ball screw, with an alternative spider cushion and a wrap-around spider cushion comprising the thrust bearing side of the ball screw assembly.

FIG. 7 is a partial perspective view of parts that slide onto the thrust bearing end of the ball screw journal, as viewed from FIG. 6. One end of the BRIDGEPORT ball screw shaft has a machined journal upon which BRIDGEPORT parts are placed along with a coupling hub (a non-BRIDGEPORT part) that substitutes for a manual crank. A matched pair of high angular contact thrust bearings 337A and 337B, then a dial holder 338, then a coupling hub 342A are located against the inner shoulder of the journal. A securing lock washer 343, and a jam nut 344 are located on the threaded end. The dial holder 338 and the coupling hub 342A are slotted so that they can slide over a woodruff key (not shown). There are two types of cushioning spiders. A wrap-around spider 342C is shown on the coupling hub 342A. An alternative spider 345 is illustrated, showing that either type allows for the jam nut and washer to secure the parts that are placed on the journal, without interfering with the operation of the coupling when the other side of the coupling 342B is in place. The axially floating dial 341 is locked in a selectable position by threaded dial lock 341A.

Figure 8:
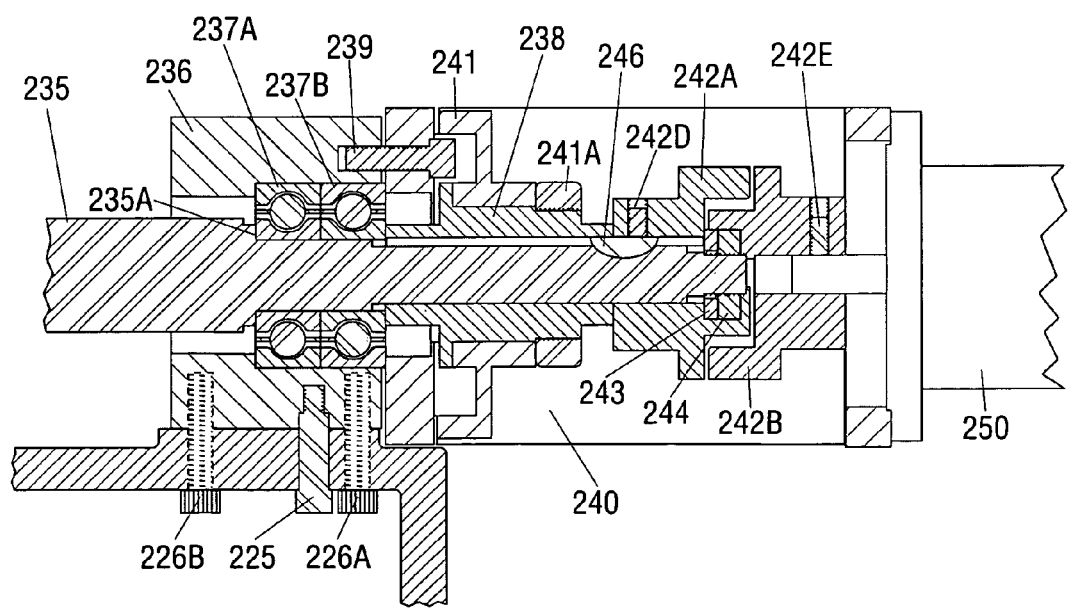
FIG. 8 is a cut-away side view of the ball screw journal assembly, including installed hardware for the Y/X axis. The Y-axis base is shown on the thrust bearing side of the screw.

FIG. 8 is a sectional side view of the Y-axis thrust bearing end of the ball screw assembly as mounted on the Y-axis base. The sectioning plane and direction is indicated by line 9-9 in FIG. 6, and is illustrative of the Y-base. (The ball screw mounting assembly and hardware are the same for the Y and X axes, and only the length of the ball screws is different, with the Y-axis using the long-table BRIDGEPORT screw.) A trust bearing block 236 is mounted to the casting with four screws, and two of the screws 226A, and 226B are shown in this sectional drawing. A precision ground shoulder screw 225 is shown that allows precision alignment of the block 232. A matched pair of thrust bearings 237A and 237B support a ball screw 235 with a shoulder 235A, on the journal of the ball screw, allowing precision abutment of the inner race of the bearing 237A. The bearing 237B abuts bearing 237A along its outer rim. With the two thrust bearings seated together in the thrust bearing block 236, the outer edge of bearing 237B protrudes out of the face of the thrust bearing block 232 by 0.1778 mm (0.007 inch) and allows the machined face of motor mount 240 to clamp the outer race of the matched pair thrust bearings 237A and 237B with three socket head cap screws that are placed 120 degrees apart around the hole that contains the bearings 237A, and 237B. One of the socket head cap screws 239 is shown. A dial holder 238 and a coupling hub 242A slide over a woodruff key 246 and clamp the inner race of the thrust bearings 237A and 237B to the shoulder 235A, on the journal of the ball screw 235. The axial backlash is taken up by tightening the jam-nut 244 on lockwasher 243, placed on the threaded end of the journal. The woodruff key semi-circular slot on the journal is placed so that one half of the woodruff key 246 locks the dial holder 238 in place, and the other half locks the coupling hub 242A in place, to prevent rotation of either. A setscrew 242D further secures the coupling to the woodruff key 246. A dial 241 is clamped to any selected rotary position by dial clamp 241A.

A motor 250 is shown with a coupling 242B that is secured on the motor shaft with set-screw 242E. (The spider 342C or 345, shown in FIG. 7, fits between the two halves of the couplings.) The motor 250 is secured to the motor mount 240 by 4 screws (not shown).

Figure 9:
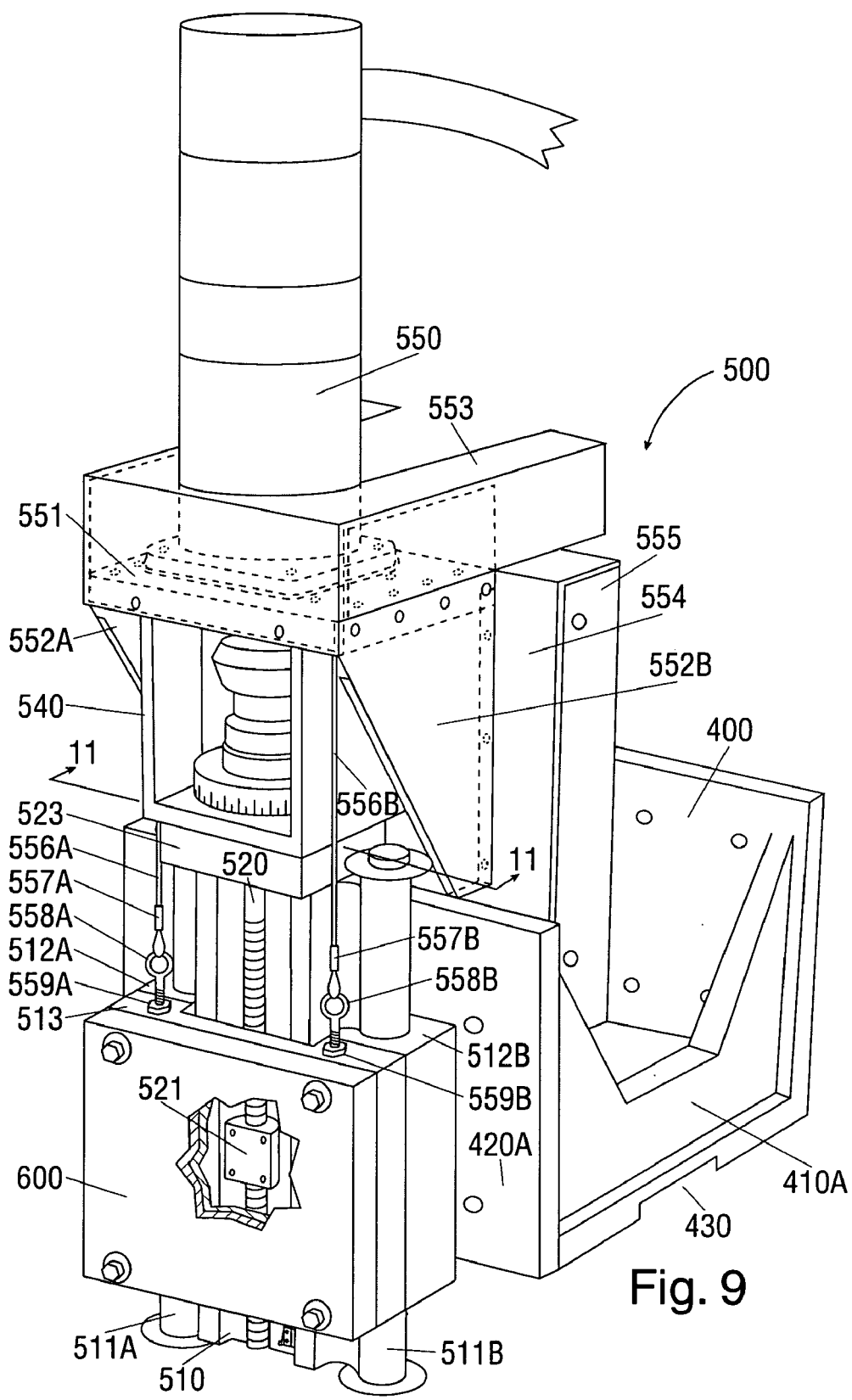
FIG. 9 is a perspective view of a vertical axis assembly mounted on a Z-axis base.

FIG. 9 shows a Z-axis base double angle plate 400, and includes a vertical axis assembly 500 mounted on one of the machined surfaces 420A. A channel 430 is machined into the bottom of the dual angle plate 400 for clearance. Reinforcing wall 410A is shown at one edge and a similar wall (not shown) is on the opposite side of plate 400. The vertical axis assembly 500 is mounted with four screws (not shown), with the back portion of the assembly 500 overhanging the top of surface 420A into an inside space of plate 400.

A THOMSON (Trademark of Danaher Co.) dual shaft rail assembly (ordered in selectable lengths) is comprised of a U-shaped dual shaft rail base 510, dual shafts 511A and 511B, twin pillow blocks 512A and 512B, and a carriage plate 513. The carriage plate 513 is a base for mounting a tooling plate 600. Precision motion control of the carriage plate 513 is accomplished by a designed retrofit as part of this machine that includes a ball screw assembly. The carriage plate 513 is machined on the inside surface with a channel and mounting holes, and is connected to the ball screw by a ball nut block 521. (A ball nut is secured inside the ball nut block 521.). The tooling plate 600 is attached to carriage plate 513 for mounting of tools or instruments.

A precision ground ball screw 520 is mounted on a thrust bearing (not shown) contained in the Z thrust bearing pillow block 523. Because of the short length of the ball screw 520 and its vertical position, a radial bearing is not used on the bottom end of the screw. The Z thrust bearing pillow block 523 is attached to the THOMSON U-shaped dual shaft base 510 by four screws (not shown) in counter sunk holes in the Z thrust bearing pillow block 523. A Z-axis motor mount 540 is attached, in a similar manner as the X and Y axis motor mount, to the Z-axis pillow block 523 by three screws (not shown) within the concave cavity of the dial.

On the top of the Z motor mount 540 is a pulley base 551 that fits over the Z motor 550 and is secured to the Z motor mount 540 by 4 screws (not shown). A rear bracket 554 is secured to the back edge of the pulley base 551 by four screws (not shown). Two side brackets 552A and 552B are attached to the mount 540 and add rigidity to the rear bracket 554. A pulley cover 553 and rear cover 555 are shown. Cables 556A and 556B, swivels 557A and 557B, and eye screws 558A and 558B are also shown. Locking nuts 559A and 559B secure the cables to the carriage plate 513, and allow the cables to be independently adjusted and locked in place.

Figure 10:
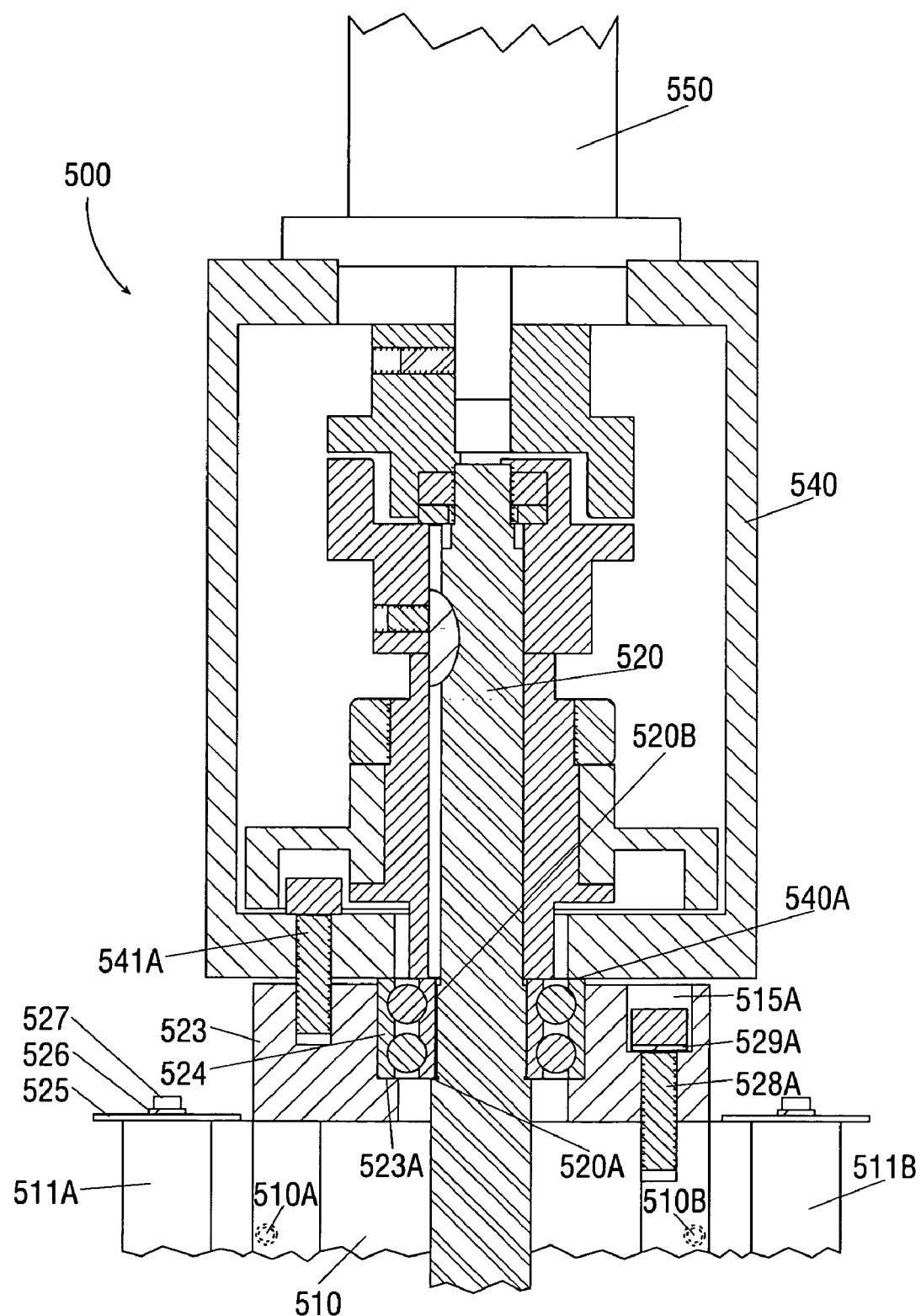
FIG. 10 is a cut-away front view of the vertical axis assembly with exposure of a Z-axis ball screw journal assembly, and a partial view of a dual shaft rail assembly.

FIG. 10 is a partial front view of the vertical axis assembly 500 taken in the plane 11-11 of FIG. 9. The vertical axis assembly 500 is mounted on one of the vertical faces of the double angle plate (not shown) with four socket head cap screws and lock washers that align with holes in the double angle plate. Two of four drilled and tapped holes 510A and 510B are shown on the rear of the dual shaft base 510. Mounted mechanical stops are on both ends of round shafts 511A and 511B. Washer 525, lock washer 526, and socket head cap screw 527, are typical for the end stops on round shafts 511A, and 511B.

The Z-axis thrust bearing pillow block 523 is shown with one illustrated countersunk hole 515A and its screw 528A and lock washer 529A. However, four holes and screws secure the pillow block 523 to the top end of the dual shaft base 510. A machined hole in the Z thrust bearing pillow block 523 supports the outer race of a standard size double row angular contact, thrust bearing 524 (GENERAL BEARING 555202) on a shoulder 523A of the pillow block 523. As with the Y and X axis, the outer face of the bearing protrudes out of the back face of the Z thrust bearing pillow block 523 by a small amount 0.1778 mm (0.007 inch). Circular ridge 540A of a hole in motor mount 540 captures the outer race of the thrust bearing 524 with three socket head cap screws that are spaced 120 degrees apart, and also secures the motor mount 540 to the bearing block 523. One of three screws 541A is illustrated. A shoulder 520A on the journal of ball screw 520 abuts the bottom of the inner race of thrust bearing 524. A section of journal 520B is machined to precision fit the inner race of the thrust bearing 524.

The remaining upper part of the journal has the same dimensions as the BRIDGEPORT ball screw journal, along with the corresponding hardware and a motor 550. This upper portion of the assembly is the same as on the Y and X axes, as described in FIG. 7, and FIG. 8 above.

Figure 11:
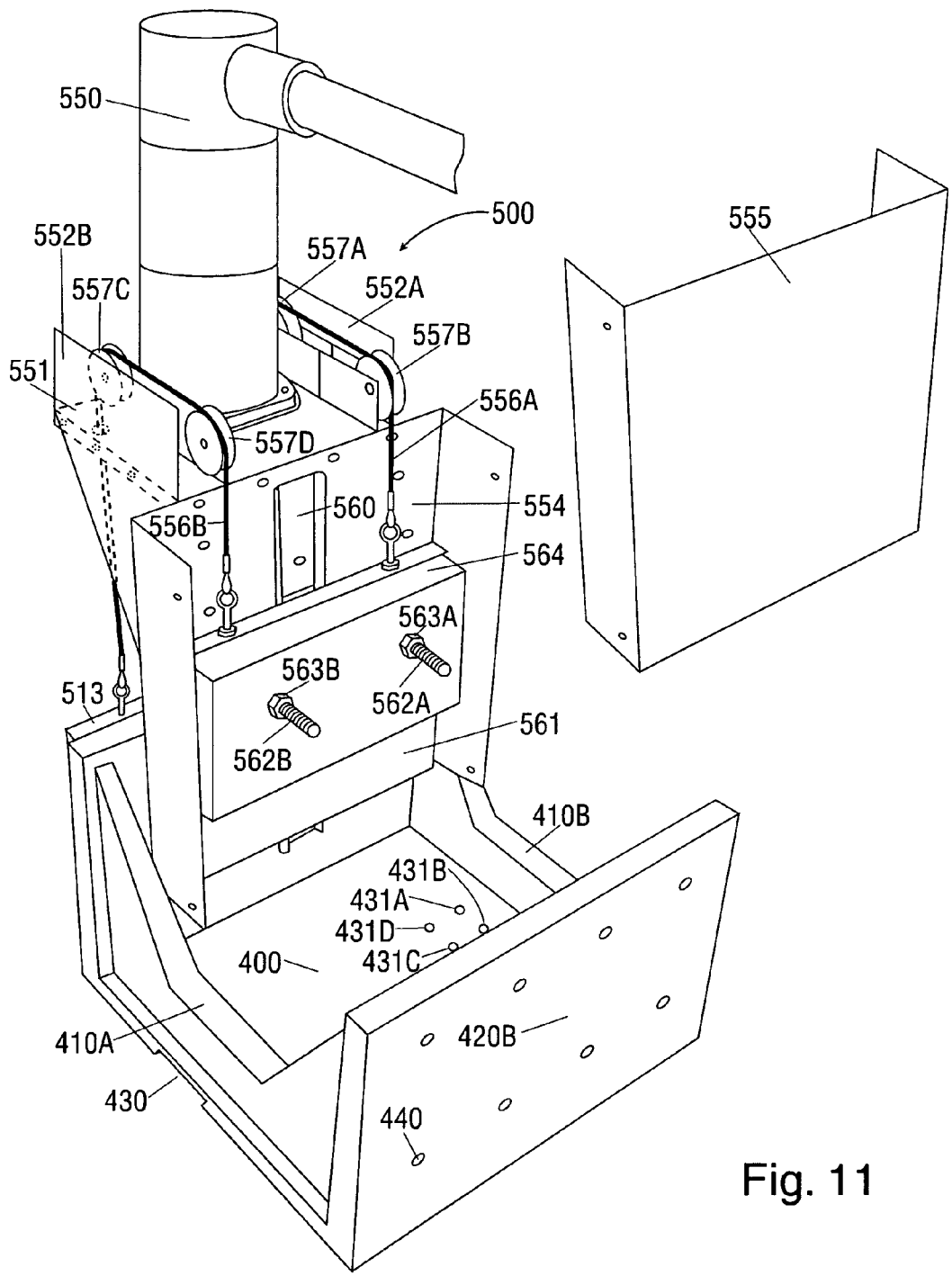
FIG. 11 is a rear, partially-exploded perspective view of the vertical axis assembly mounted on the double angle plate, exposing the counterweight assembly.

FIG. 11 is a perspective view of the dual angle plate 400 and vertical axis assembly 500 as viewed from the rear. Dual angle plate 400 shows the exposed vertical face 420B and a mounting hole 440, which is typical of one of eight holes drilled in a rectangular pattern in the vertical machined face 420B. Reinforcing walls 410A and 410B are shown. Clearance channel 430 is a machined surface that allows plate 400 to be secured to ball nut block 334 (FIG. 6) through holes 431A-D. Plate 400 is a sliding carriage moving in the X-axis direction. Clearance channel 430 also allows full travel along the X-axis. Pulley base 551 is secured to the top of the Z-axis motor mount 540 (FIG. 9) by four screws (not shown) placed around the square flange edges of Z motor 550. The rear bracket 554 is secured to the back edge flange of pulley base 551 with four screws (not shown) and reinforced with side brackets 552A and 552B with attaching screws (not shown).

Back cover 555 is moved out of the way to expose the pulley and counterweight system from the rear. A counterweight linear slide 560 is mounted on the centerline of the rear bracket 554 with button head cap screws and nuts (not shown). (The counterweight slide is a ball bearing drawer slide that is slightly modified by cutting off a portion of the extended base and holes are drilled for mounting. Drawer slides have a low profile with ball bearing retainers and have virtually no looseness in the bushing and slide mechanism in all perpendicular directions to the slide. Drawer slides are also readily available for different loads and lengths.) The base counterweight 561 is secured to the counterweight slide 560 with button head cap screws (not shown), and is horizontally rigid along the motion in the vertical plane. The counterweight base 561 is made of a steel plate and includes 2 long screws 562A and 562B mounted in drilled and tapped holes. The counterweight base 561 is also sized to be equal in weight to the total weight of the moving portion of the dual shaft railing system 512A, 512B, 513 and the tooling plate 600 (FIG. 9).

Any tooling, such as a high-speed spindle, is counterweighted by adding an equal weight, such as a 25.4 mm (1 inch) lead plate 564, of a certain dimension to the base 561. The dimension of the added weight, as in this embodiment, which uses a 25.4 mm (1 inch) thick lead plate, can be easily determined by referencing the weight per cubic inch of lead 0.1858 kg (0.4096 lb) as referenced in the Machinery's Handbook by Erik Oberg, et al. (Any metal or heavy material can be used for a counterweight.) The added counterweight is secured on screws 562A and 562B by nuts 563A and 563B. Two cables 556A and 556B are secured in the same manner as on the front carriage plate 513 (FIG. 9) with the cables being independently adjustable and locked in place on the back counterweight side. Four identical pulleys are mounted on the top of the pulley base 551. Pulleys 557A and 557B are shown mounted on their support brackets. Pulleys 557C and 557D are shown without their support brackets. All pulleys are secured with screws (not shown) on the pulley base 551.

The height of the pulleys that support the cables 556A and 556B allows the vertical carriage slide 513 and the counterweight base 561 with selectable weight 564, to move their full vertical travel, so that the counterweight base 561 does not bottom out on the double angle plate 400 base.

Operation—FIGS. 1, 2, 3, 6, 8, 9, and 11

Precision motion control of present automated machines, such as vertical milling machines, all include microprocessor-based computers as part of a CNC system. Current CNC milling machines almost all include three axis simultaneous contouring that enables a tool to precisely move in a three dimensional plane, such as in a spiral path, even while removing material with a cutting tool. A personal computer (PC) can also be made into a CNC system by adding CNC software, motion control boards, other miscellaneous function boards, motor driver boards, etc.

Closed-loop systems control both position and velocity through feedback in conjunction with programmed signals from the motion control part of the CNC electronics as part of the loop that includes servo drivers and motors. The closed loop system ensures that the motors reach their programmed point before another command is executed. Most CNC machines use servo systems.

On smaller CNC machines, using open loop systems is sometimes more economical if the load on the motor is within a range that is safe for open loop type motors, specifically stepper motors. Open loop systems are useable in many applications besides material removing, such as non-contact machining, precision glue dispensing, etc.

Stepper motors and other open-loop systems operate differently. A binary number is translated to an activation of a certain number of magnetic pole sequences in a controlled serial stream. The stepper motor stops at the last activated pole or a vectored position between poles if the driver is capable of micro-stepping. The actual position of the rotor (the revolving part of the motor) is not normally verified in the computer. The inherent drawback to present stepper motors is that at the higher positioning speeds, the motor is at reduced power because the inductance of the windings in the motor does not allow the current to build up because the poles are being switched too fast. Other factors influence mis-positioning in open loop systems, such as acceleration/deceleration ramping of signal, load change, etc. These factors can cause mis-positioning in the driven axis as the computer cannot know if the armature is on its proper pole group. Mis-positioning can happen more frequently when the load on the motor changes abruptly, as on the vertical axis, especially without a counterweight system. CNC machines larger than the standard manual BRIDEGPORT milling machine are not generally suitable with open loop systems despite the cost advantage of an open loop system.

The machine in FIG. 1 is of a size that can be used with either a closed loop servo, or an open loop system, especially with a Z-axis counterweight. When the machine is turned on and all the motors are activated, the holding torque on the motor holds the axis in position. When any or all three axis, is/are programmed to move, the motor/motors move at a programmed feed rate and stop rotation at a point when the count is complete. On the X, Y, and Z axes, the motors 250, 350, and 550 are connected to the ball screws as illustrated in FIGS. 1, 6, 8, 9, and 10. As an example, in FIG. 6 (X-axis) the ball screw 335 turns and moves the ball nut, which is captured in the ball nut block 334, and anchored to the double angle plate 400 (FIG. 1). The anchored ball nut block 334 moves the plate 400 linearly by an amount that reflects the numerical quantity stored in the computer for that programmed move. On the Y-axis, which uses the same ball screw supporting hardware as the X-axis, the ball nut block is anchored to the X-axis base 300 (FIG. 1) and the Y motor 250 (FIG. 8) drives the ball screw 235 (FIG. 8). On the vertical Z-axis, the ball screw 520 (FIG. 9) includes a ball nut that is captured in the bearing block 521, and the motor 550 drives the carriage 513.

A compact, economical, and effective way of providing a horizontally rigid counterweight is part of the vertical assembly. Additionally, counterweights can be easily added or subtracted. As the motor on the Z-axis drives the carriage plate 513 (FIG. 9), the counterweight is made to move up or down in a vertical path without lateral movement. As the tooling moves up or down, the motor 550 (FIG. 11), is not affected differently by the force of gravity on the load (carriage and tooling). The movement of the gantry in the X or Y axis planes also does not affect the counterweight (cause it to swing or oscillate).

An example of an application for this machine is the making of wave solder pallets. Such pallets are usually made from fiberglass/composite material as they resist absorbing heat and keep their shape and size even at high temperatures. Wave solder pallets are made from flat sheet stock. The pallets are shaped like a picture frame and are made to fasten printed circuit boards of various shapes and sizes around the inside edges. FIG. 1 illustrates a high-speed-spindle 601 attached to the tooling plate 600. An added tooling plate 700 (FIG. 2) is attached to the Y-axis base 200 (FIG. 1), and is used for clamps in order to secure the material. The tool cutting path is programmed in the CNC 802 (FIG. 3) to mill, rout, and drill holes in one setup.

Advantages

From the description above, a number of advantages of the machine are evident.

a) The machine is lightweight yet rigid, allowing it to be mobile when placed on a framed dolly. The machine is easily transportable without using heavy-duty moving equipment or a machinery-moving vehicle.
b) The base castings can be machined for use with different types of linear bearing ways.
c) The machine combines a Y-axis open frame and a gantry for the X-axis allowing use over a table or conveyor, or with an installable tooling plate that holds or secures items to be processed.
d) The machine adapts a precision ball screw of two standard sizes, with a design in hardware that allows it to be placed on top of a table in the X, and Y axis plane.
e) The machine includes a dual vertical angle plate integrated into a common base for the Z-axis. This design allows for two vertical axis assemblies that are mountable on a common base.
f) The machine includes a compact, modular, vertical Z-axis assembly that integrates a horizontally rigid counterweight system including a means of easily adding or subtracting weights according to the tooling or instrument used. (The dual round shaft rail base of the vertical assembly 510 and its basic components can be substituted with a dual shaft rail base that uses rectangular shafts and linear bearing slides, and still keep the counterweight assembly intact.)

Conclusion, Ramifications, and Scope

The above described computer-controlled machine offers a low cost and easily-configurable solution for applications that are currently done on expensive CNC machines, or are costly to build on a one-of-a-kind custom design basis.

In applications involve machining of composites and like materials, this machine makes installing a dust containment shell around the machine much easier, for safety and health reasons.

The easy attachment of tools or instruments with their respective counterweight allows numerous applications such as:

Precision machining of composite and plastic materials.
Light precision machining of metals, especially flat or small parts.
Laser engraving, etching, and scribing, especially on hard-to-hold parts.
Precision gluing.
Inspection of printed circuit boards using machine vision technology.
Many other robotic type tasks.

The machine described above has numerous uses and applications, and can be described as a multi-purpose CNC/robotic machine. Many changes and modifications can be made on the machine without departing from the spirit and scope of the invention. The above described embodiments should not be construed as to limit the scope of the invention. Accordingly, the scope of the invention should be determined not by the embodiment illustrated, but by the appended claims and their legal equivalents.

The invention claimed is:

1. A multiple purpose, multiple axis computer numerical control machine comprising:
a Y axis base, said base having a rectangular open frame, said base including means for securing a first tooling plate parallel to the Y axis for supporting a workpiece, said base including means for causing and guiding linear motion of an upper assembly in the Y axis direction, said base configured for the support of the means for causing and guiding linear motion of the upper assembly in the Y-axis direction,
an X axis base slidably mounted on said Y axis base, said X axis base including means for causing and guiding linear motion in the X axis direction of a portion of the upper assembly, said X axis base configured for the support of the means for causing and guiding linear motion of the portion of the upper assembly in the X-axis direction, a Z axis base slidably mounted on said X axis base, said Z axis base including two vertical surfaces with a common base, wherein the upper assembly includes the X axis base and the Z axis base, and the portion of the upper assembly includes the Z axis base, the machine also comprising a vertical axis assembly mountable on said Z axis base, said vertical axis assembly including means for causing and guiding linear motion of a second tooling plate in the vertical direction, which vertically moveable tooling plate is for interchangeably supporting a variety of tools, said means for causing and guiding linear motion of the second tooling plate including a horizontally rigid counterweight assembly connected to said second tooling plate, the counterweight assembly including a guided counterweight base that is equal in weight to the total weight of the second tooling plate and any other vertically movable structure except for the interchangeable tools, and the counterweight assembly includes means for facilitating the easy addition or subtraction of additional weight to or from the counterweight base equal to the weight of the interchangeable tool that is to be supported on the second tooling plate.

2. The machine of claim 1 wherein the X and Y axis means for causing and guiding linear motion includes standardized ball screws for the X and Y axis of two standard lengths, said ball screws including means to support, and hold axially rigid, said ball screws on two surface pads, said ball screws include standardized matched-pair thrust bearings, standardized dial assemblies as inclusive parts on said ball screws, means for connecting said ball screws to precision motion control motors, each said ball screw includes a ball nut block capturing ball nut of said ball screw, said ball nut block of said ball screw of said X axis is attachable to said Z axis base, and said ball nut block of said ball screw of said Y axis is attachable to said X axis base.

3. The machine of claim 1 wherein the vertical axis means for causing and guiding linear motion control includes a ball screw supported on one edge of said Z-axis base, said ball screw supported on one side by a bearing block with surfaces that allow inclusion of a dual row angular contact bearing, means for connecting said ball screw to a precision motion control motor, and a ball nut block capturing ball nut of said ball screw, said ball nut block attached to a carriage plate to which the second tooling plate is attached.

* * * * *